United States Patent [19]
Moshe

[11] Patent Number: 5,005,616
[45] Date of Patent: Apr. 9, 1991

[54] OVERARM ROUTER SHAPER

[76] Inventor: Bill L. Moshe, 868 Kettering, Pontiac, Mich. 48058

[21] Appl. No.: 535,776

[22] Filed: Jun. 11, 1990

[51] Int. Cl.⁵ .................................................. B27C 5/00
[52] U.S. Cl. ........................ 144/134 A; 144/134 R; 144/286 R; 144/286 A; 269/289 R; 269/309
[58] Field of Search ............... 144/1 R, 1 C, 35 R, 144/134 R, 134 D, 134 A, 136 R, 136 C, 286 R, 286 A; 269/289 R, 303, 309

[56] References Cited
U.S. PATENT DOCUMENTS

| 3,794,089 | 2/1974 | Morse | 144/35 R |
| 4,405,003 | 9/1983 | Watson et al. | 144/286 R |
| 4,556,094 | 12/1985 | Willocks | 144/134 A |

Primary Examiner—W. Donald Bray
Attorney, Agent, or Firm—Basile and Hanlon

[57] ABSTRACT

A self-supporting table to support a machine and to support a workpiece in either a horizontal or vertical position. The vertical and horizontal supports provide planes which aid the machine operator in feeding the workpiece into the machine. The versatility of the apparatus allows for efficient machining since only one support table and machine is needed instead of two.

2 Claims, 1 Drawing Sheet

OVERARM ROUTER SHAPER

BACKGROUND OF THE INVENTION

1. Field of the Invention

This invention relates to an apparatus which allows for both horizontal and vertical support of a large workpiece during a machining operation. Machines, such as router shapers, typically perform operations on the corners or edges of a workpiece and therefore may require the workpiece to be machined in both horizontal and vertical position.

2. Description of the Relevant Art

In the field of carpentry, it is often necessary to perform certain machining operations on the corners or edges of a workpiece in order to produce desired contours. This requires the workpiece to be machines in both horizontal and vertical positions since both sides of a corner may require machining. Because large workpieces are commonly used in the field of carpentry, the same support table cannot typically be used for both horizontal and vertical support of the workpiece. Therefore, two different support tables may be required along with two different machines. This would obviously be more expensive and less efficient.

Thus, it is desirable to provide an apparatus which can machine a large workpiece in both horizontal and vertical positions.

SUMMARY OF THE INVENTION

The present invention includes a device which supports a large workpiece, such as a board, while being fed into a machine, such as a router shaper. The device allows for either vertical or horizontal support of the workpiece while providing a horizontal or vertical plane in which to guide the workpiece. This becomes important when using a machine such as a router because only one side of a corner can be machined at a time. To machine both sides of a corner, the workpiece must be machined in both a vertical and horizontal position. The invention provides a common support table for both vertical and horizontal positions, thereby eliminating the need for separate support tables and separate machines.

It is the object of the invention to provide a support table which allows for both the horizontal and vertical positioning of a workpiece while being fed into a machine.

BRIEF DESCRIPTION OF THE DRAWINGS

Other objects, features, and advantages of the present invention will become more fully apparent from the following detailed description of the preferred embodiment, the appended claims, and in the accompanying drawings in which:

DESCRIPTION OF THE PREFERRED EMBODIMENT

Figure 1:
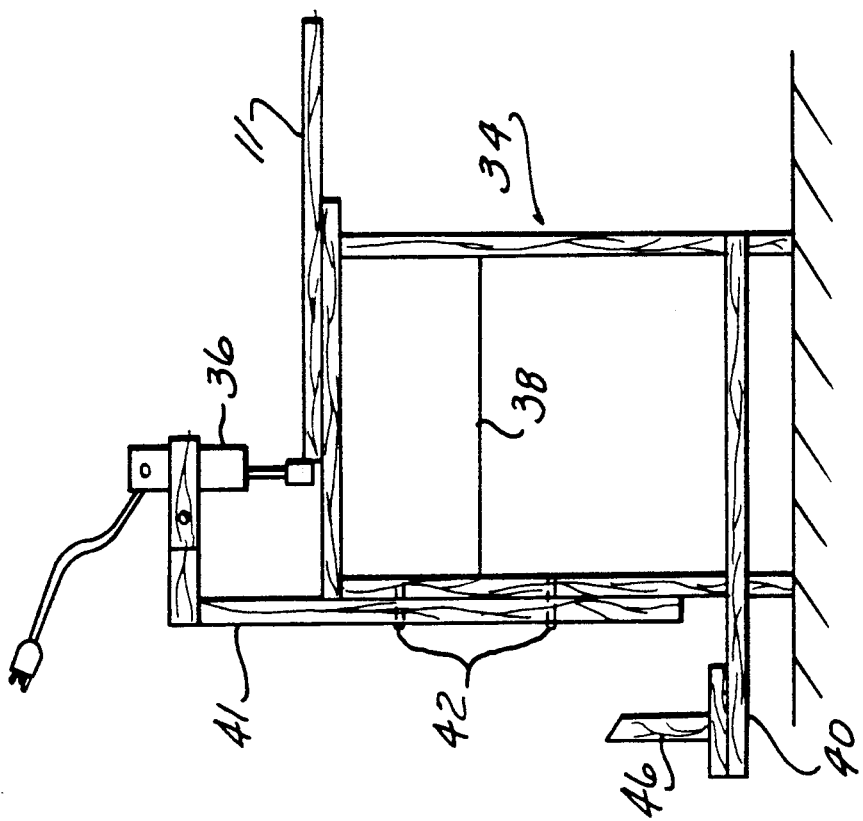
FIG. 1 is a side view of the support table utilizing horizontal support of a workpiece.

FIG. 1 shows the support table 34 being used for horizontal support of a workpiece 11 while being fed into a machine 36. The support table 34 is comprised of a machine base 38 with a lower extension 40 connected to the base 38. An "L" shaped overarm 41 is bolted onto the base 38 by two bolts 42. The machine 36 is supported by the end of the overarm 41. A machine operator (not shown) would rest the workpiece 11 on the support table 34 and slowly feed the workpiece 11 into the machine 36.

Figure 2:
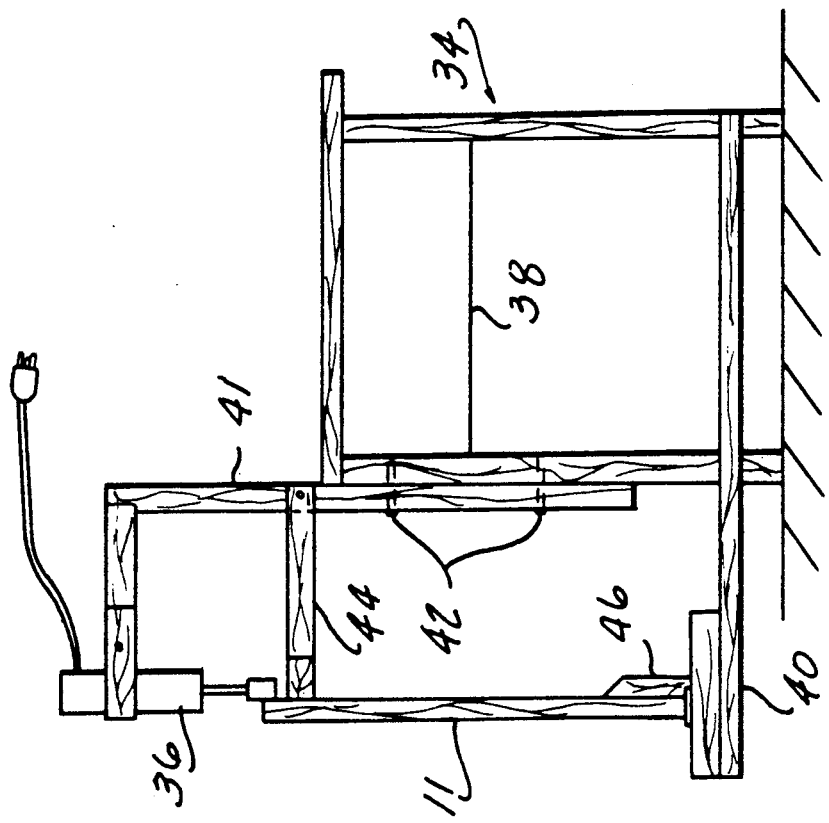
FIG. 2 is a side view of the support table utilizing vertical support of a workpiece.

FIG. 2 shows the support table 34 being used for vertical support of a workpiece 11. The overarm 41 is unbolted from the position shown in FIG. 1, rotated 180°, and bolted backed onto the machine base 38 as shown in FIG. 2. An upper extension 44 is bolted onto the overarm to provide support for the workpiece 11. A guide rail 46 is attached to the lower extension 40 and provides additional support for the workpiece. The workpiece 11 rest on the lower extension 40 while the guide rail 46 and the upper extension 44 provide a vertical plane for guidance. A machine operator (not shown) would slowly feed the workpiece 11 into the machine 36.

While one embodiment of the invention has been discussed in connection with the preferred embodiment thereof, it should be understood that there may be other embodiments which fall within the spirit and the scope of the invention and that the invention is susceptible to modification, variation, or change without departing from the proper scope and fair meaning of the following claim:

What is claimed is:

1. A device to assist a machine operator in holding and feeding a piece of stock into a machine, the device comprising:

a base;

a support connected to said base;

a machine connected to said support;

a pair of parallel extensions connected to said base providing a vertical plane for said piece of stock; and means for allowing rotation of said support.

2. A device to assist a machine operator in holding and feeding a piece of stock, such as a board, into a machine, such as a router shaper, the device comprising:

a machine base having four legs supporting a table top;

a lower platform extension connected to said machine base;

A guide rail connected to said lower platform extension running the full length of said machine base;

an "L" shaped overarm having the longer side of the overarm connected to said machine base such that the longer side is in a vertical position;

a router shaper supported by the short side of said overarm;

an upper platform extension connected to the longer side of said overarm and extending away from said machine base and directly over said lower platform; and means for allowing 180° rotation of said overarm.

* * * * *